(12) United States Patent
Porras et al.

(10) Patent No.: US 8,898,625 B2
(45) Date of Patent: Nov. 25, 2014

(54) OPTIMIZED STORAGE OF FUNCTION VARIABLES

(76) Inventors: Victor Leonel Hernandez Porras, San Francisco, CA (US); Roger Scott Hoover, Cheyenne, WY (US)

( * ) Notice: Subject to any disclaimer, the term of this patent is extended or adjusted under 35 U.S.C. 154(b) by 1238 days.

(21) Appl. No.: 12/316,731

(22) Filed: Dec. 15, 2008

(65) Prior Publication Data

US 2010/0153911 A1    Jun. 17, 2010

(51) Int. Cl.
*G06F 9/45* (2006.01)
*G06F 9/44* (2006.01)
*G06F 9/30* (2006.01)

(52) U.S. Cl.
CPC . *G06F 8/443* (2013.01); *G06F 8/30* (2013.01); *G06F 9/44* (2013.01); *G06F 8/40* (2013.01); *G06F 9/30* (2013.01); *G06F 8/315* (2013.01)
USPC .......................................................... 717/106

(58) Field of Classification Search
CPC ............... G06F 9/44; G06F 9/30; G08F 8/30; G08F 8/40; G08F 8/443
USPC .......................................... 717/106, 130, 146
See application file for complete search history.

(56) References Cited

U.S. PATENT DOCUMENTS

| | | | | |
|---|---|---|---|---|
| 6,898,786 | B1 * | 5/2005 | Sokolov ......................... | 717/139 |
| 7,558,935 | B1 * | 7/2009 | Boucher et al. ................ | 711/170 |
| 2004/0015920 | A1 * | 1/2004 | Schmidt ......................... | 717/153 |
| 2005/0034124 | A1 * | 2/2005 | House et al. ................... | 718/100 |
| 2009/0144709 | A1 * | 6/2009 | Donohue et al. .............. | 717/146 |
| 2009/0150422 | A1 * | 6/2009 | Meijer et al. ................... | 707/102 |
| 2009/0307431 | A1 * | 12/2009 | Garst et al. ..................... | 711/132 |
| 2009/0307669 | A1 * | 12/2009 | Garst et al. ..................... | 717/130 |

OTHER PUBLICATIONS

Arnold et al. Adaptive optimization in the Jalapeño JVM. OOPSLA. ACM (2000).
Chambers et al., "An efficient implementation of SELF, a dynamically-typed object-oriented language based on prototypes." LISP & Symbolic Computation, pp. 243-281 (1991).
Chambers et al., "Making pure object-oriented languages practical." OOPSLA Conf. Proc. (Oct. 1991).
Fink et al., "Design, implementation and evaluation of adaptive recompilation with on-stack replacement." Proc. Int'l Symposium on Code Generation and Optimization: feedback-directed and runtime optimization, pp. 241-252 (2003).
Holzle, et al., "Debugging optimized code with dynamic deoptimization." ACM SIGPLAN Conf. on Programming Langauge Design & Implementation (Jun. 1992).
Soman et al., "Efficient and general on-stack replacement for aggressive program specialization." Int'l Conf. on Programming Languages & Compilers (Jun. 2006).
USENIX Assn., "Proc. JAVA virtual machine research and technology symposium." (JVM) (Apr. 2001).

* cited by examiner

*Primary Examiner* — Jonathan C Teixeira Moffat
*Assistant Examiner* — Lynda Dinh
(74) *Attorney, Agent, or Firm* — Womble Carlyle Sandridge & Rice, LLP

(57) ABSTRACT

Optimized storage of function variables in compiled code is disclosed. It is determined that a variable of a first function is required to be available for use by a second function subsequent to return of the first function. Machine code is generated to escape the variable from a storage location in a stack memory to a storage location in a heap memory, prior to the variable being removed from the stack memory, in connection with return of the first function.

21 Claims, 6 Drawing Sheets

OPTIMIZED STORAGE OF FUNCTION VARIABLES

BACKGROUND OF THE INVENTION

In certain programming languages that are either object-oriented or support some aspects of object-oriented programming, such as JavaScript, function variables are stored in a temporary storage location, such as a temporary object, that resides in a portion of memory known as the heap. The heap memory is a pool of memory that is available to be allocated and used dynamically by applications and other processes, for example to store and access values used by such applications and other processes. By contrast, in certain other programming languages function variables are stored in the "stack" portion of memory. Typically, the time and/or other resources required to access a variable stored in the stack are less than the time and/or other resources required to access such a variable from a temporary object or other structure in the heap.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
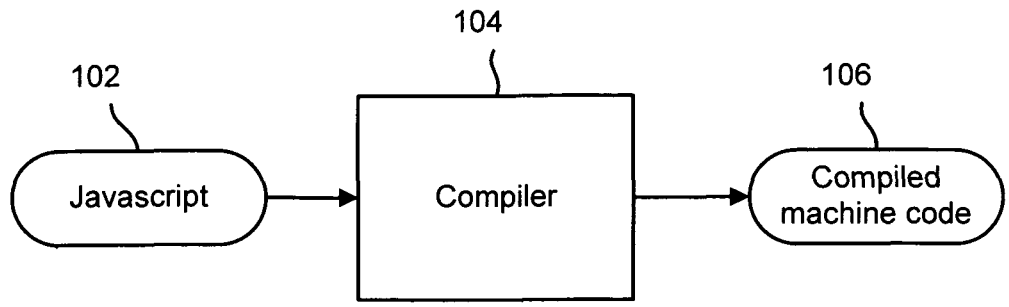
FIG. 1 is a block diagram illustrating an embodiment of a prior art system for compiling JavaScript.

FIG. 1 is a block diagram illustrating an embodiment of a prior art system for compiling JavaScript. In the example shown, JavaScript 102 is compiled by a compiler 104 which provides compiled machine code 106 that corresponds to the JavaScript 102. The compiled machine code 106 comprises instructions directly executable by a CPU or other processor, for example.

Figure 2:
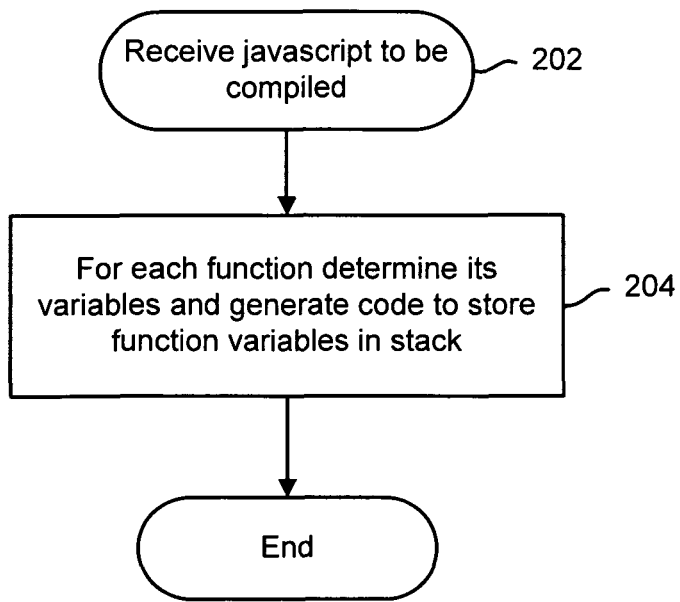
FIG. 2 is a flow diagram illustrating an embodiment of a prior art process for generating machine code.

FIG. 2 is a flow diagram illustrating an embodiment of a prior art process for generating machine code. JavaScript (or code that like JavaScript stores function variables in a temporary object or another structure or location in heap memory) is received (202). For each function, the variables associated with the function are determined and machine code is generated to store the function variables on the stack, instead of in heap memory (204).

Figure 3:
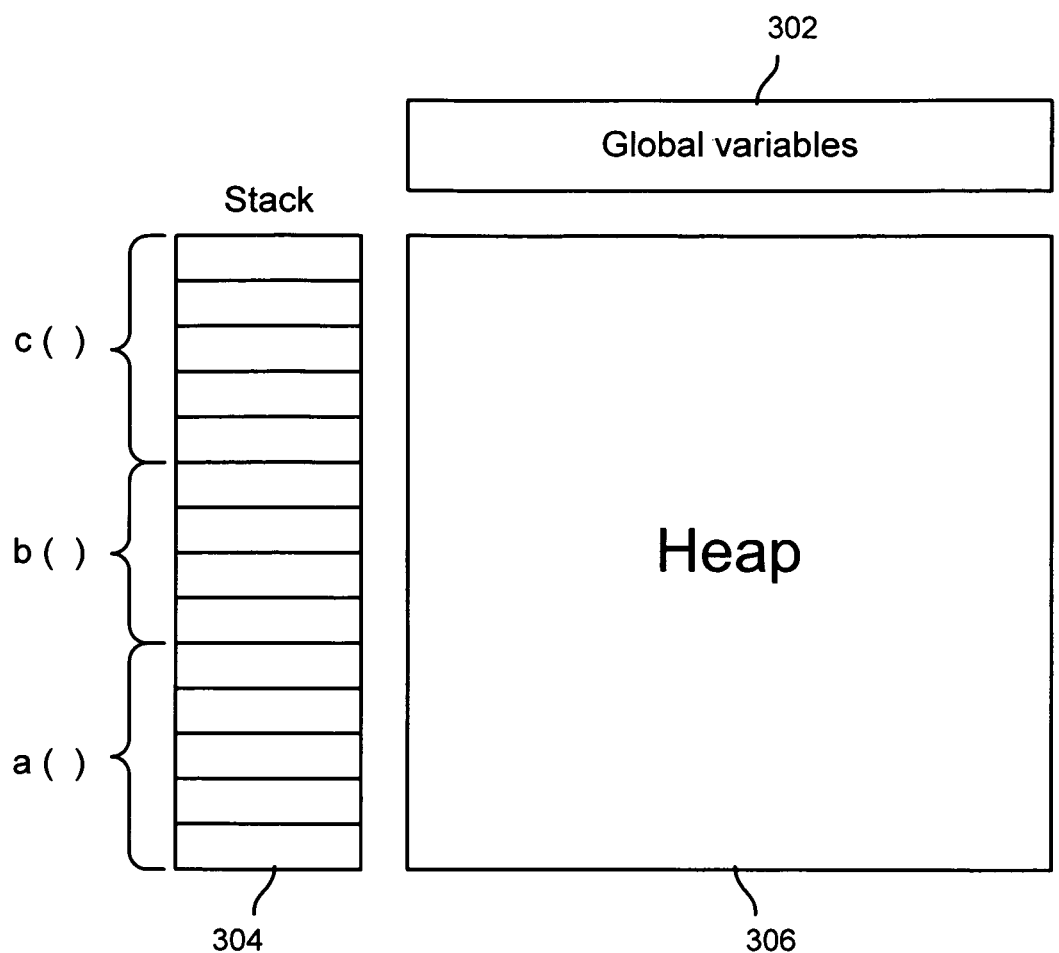
FIG. 3 is a block diagram illustrating an embodiment of a computer memory.

FIG. 3 is a block diagram illustrating an embodiment of a computer memory. In the example shown, the memory has been organized into a region 302 in which global variables, which are available to all functions and other code, are stored; a stack region 304 in which values associated with functions that have been invoked but have not yet finished executing (returned) are stored (example functions a, b, and c are shown); and a heap memory 306 which is available to be allocated dynamically for use by applications or other processes executing on a computer system with which the computer memory of FIG. 3 is associated. As noted above, storing function variables in locations in stack 304 generally results in faster execution times than typically would be achieved by similar code required to access such values from locations in heap memory.

The approach illustrated in FIG. 2 affords the benefits (e.g., faster execution) of storing function variables on the stack, instead of in heap memory as in the original JavaScript or other source code; however, the approach shown in FIG. 2 would generate errors if the JavaScript (202) included a second function created during execution of the initial function or other code that depended on the variables of the first function to remain available subsequent to return of the first function. In languages such as JavaScript the variables of a first function are available to be used by a second function created during the execution of the first function, even if the first function has "returned" prior to the time the second function requires and uses such variables. Examples of this condition occurring include where a first function returns a second function that uses one or more variables of the first function. In JavaScript, for example, the mechanism by which such variables are made and remain available to the second function is the temporary object or objects that are used to store function variables. When a first function returns, its variables remain stored in the temporary object(s) associated with the first function and the syntax and rules of the programming language provide for such variables to remain available for use by any function created by the first function. Such variables of the first function are said to be within the "scope" of the second function and are available for use by the second function in the same manner as variables declared as variables of the second function. If JavaScript or similar code to be compiled (202) included a second function that relied on the continued availability of variables associated with the first function, even after the first function has finished executing (returned), machine code generated using the approach shown in FIG. 2 would result in an error, because the first function's variables would no longer be stored in the stack once the first function has returned.

Optimized storage of function variables in compiled code generated based on source code written in a programming language that uses temporary objects or other structures that reside in heap memory to store function variables is disclosed. Specifically, selectively providing machine code that includes instructions that "escape" the variables of a first function from a storage location in stack memory to a temporary object or other structure in heap memory, if analysis indicates such variables are or may be required to be available to a second function after return of the first function, is disclosed. In some embodiments, during compilation, code is generated to store function variables at least initially in the stack portion of memory. Source code and/or an intermediate representation thereof is analyzed to determine whether a variable associated with a first function may be required to be available for use by a second function at a time after the first function has returned, such that if the first function's variables were stored only in the stack the variables would no longer be available to the second function. If so, code is generated to store the variables of the first function in the stack and in addition to escape those variables to a temporary object prior to termination of the first function and deletion of associated variables from the stack. In some embodiments, the code generated for the second function causes the second function to look to the temporary object for the value of the variables on which it operates. While the first function and its associated values are available on the stack, the temporary object stores pointers to those values as stored on the stack. Upon an escapement criterion or criteria being met, e.g., in connection with return of the first function, the pointers are replaced with the corresponding values copied from the stack. Using this approach, the first function's variables are available to it, and to other functions within its scope, from the stack while the first function is executing, which has the advantage noted above of providing faster execution than if the variables were stored in the heap, but subsequently are escaped to the heap to maintain their availability to functions that continue to run after the first function returns. In some embodiments, functions whose variables are not required to remain available to any other function beyond the return of the function with which the variable is associated are compiled such that their variables are stored in the stack with no provision being made to escape those values to a temporary object or other structure stored in heap memory.

Figure 4:
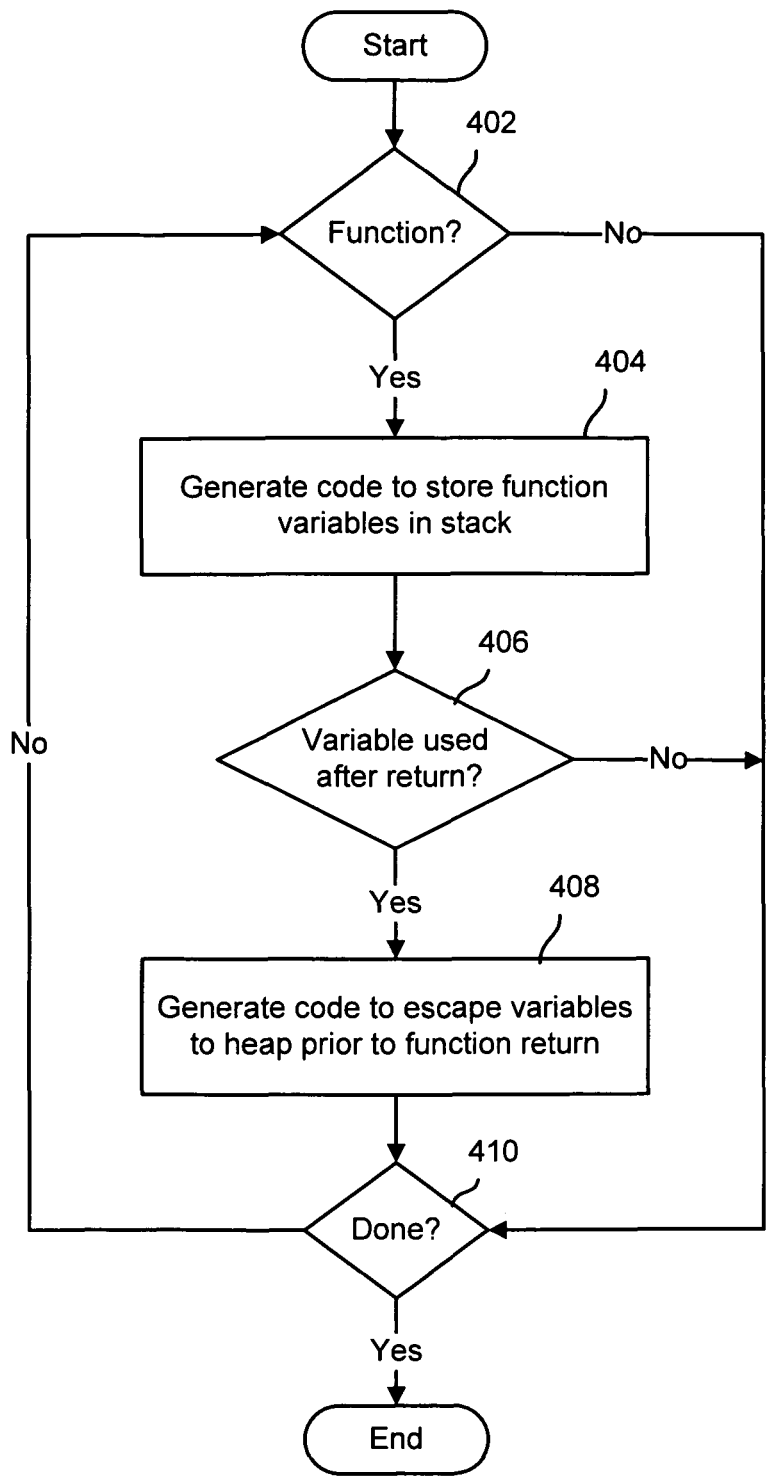
FIG. 4 is a flow diagram illustrating an embodiment of a process for generating optimized machine code.

FIG. 4 is a flow diagram illustrating an embodiment of a process for generating optimized machine code. In the example shown, JavaScript or other source code, or an intermediate representation thereof, such as LLVM or other byte code, is analyzed to identify one or more functions (402). For each function, machine code is generated to store in stack memory any variables, if any, associated with the function, for example, variables declared by code associated with the function (404). The source code and/or an intermediate representation thereof is analyzed to determine whether any other function uses or otherwise requires or may require access to a variable of the function referenced in the sentence immediately preceding this sentence at a point in execution of the source code (e.g., script, applet, application, or other program) at which the latter function has already returned, such that if the latter function's variables were stored only on the stack those variables would no longer be available after the function has returned (406). If any such need is found (406), code is generated to escape the variables of the affected function from the stack to heap memory prior to return of the affected function (408). The process continues until all functions have been analyzed and appropriate code has been generated as applicable in steps 404 and 408 (410).

In some embodiments, during compilation of JavaScript or similar code a list is generated of those functions determined to have one or more variables that are or may be required to remain available after the function has returned. In some embodiments, for each such function, the variable(s) required to survive return of the function and for each such variable its pre-return storage location are included in the list.

In some embodiments, JavaScript or similar code is compiled in a multistage process during the course of which one or more intermediate representations of the code, such as LLVM and/or other byte code, are generated. In some such embodiments, an intermediate representation of the code is analyzed to determine which functions have variables that are required to survive return of the function. In some embodiments, the foregoing analysis is performed after one or more optimizations have been performed on the intermediate representation, such that optimized byte code is analyzed and escapement code is generated only for those functions determined to require escapement based on the optimized byte code or other intermediate representation.

Figure 5A:
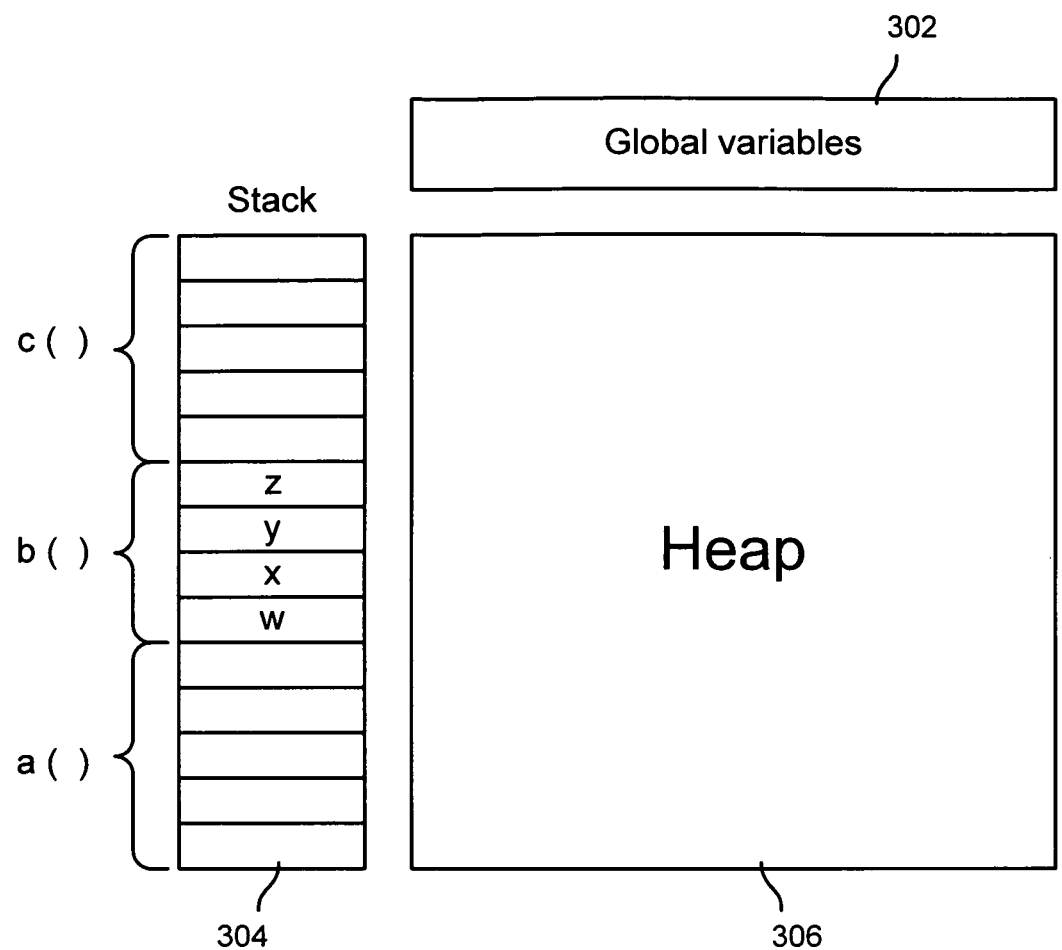
FIGS. 5A and 5B are block diagrams illustrating an embodiment of a system configured to conditionally escape function variables from the stack to heap memory.
Figure 5B:
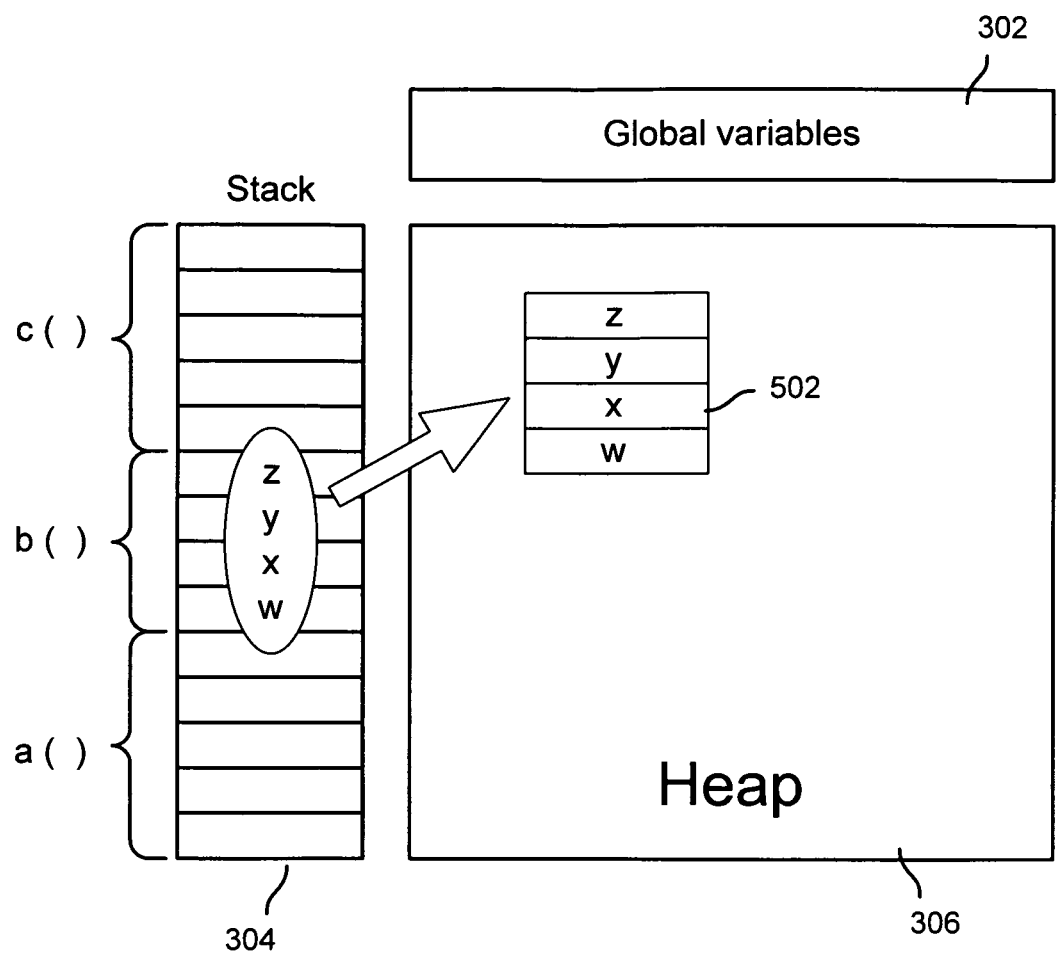

FIGS. 5A and 5B are block diagrams illustrating an embodiment of a system configured to conditionally escape function variables from the stack to heap memory. In the example shown, variable w, x, y, and z of a function b( ) are shown as being stored in a portion of stack 304 that is associated with function b( ). For example, a function a( ) may have invoked the function b( ) having the variables shown. In this example, a function c( ) requires use of one or more variables of the function b( ) after the function b( ) has returned, for example because the function b( ) creates and returns the function c( ) which uses one or more variables of function b( ). Other examples of cases in which a function such as c( ) may require access to the variables of a function such as b( ) include where a first function such as b( ) stores a second function such as c( ) in a globally-accessible variable, or where a first function such as b( ) passes a second function such as c( ) to a third function called by the first function. The following is an example of a function b( ) and a function c( ) that uses one or more variables of the function b( ) subsequent to return of the function b( ):

In some embodiments, prior to return of function b( ) and/or prior to removing from the stack variables w, x, y, and z associated with function b( ), the variables of a function such as b( ), i.e., one the variables of which are or may be required to remain available after the function has returned, are escaped to heap memory. In the example shown in FIG. 5B, the variables of function b( ) are shown being copied to corresponding locations in a temporary object 502. In some embodiments, code associated with the function c( ) and/or any other function other than function b( ) that accesses the variables of function b( ) is configured to look to temporary object 502 for such values. While the variables of function b( ) are stored on the stack, the temporary object 502 includes in corresponding storage locations pointers to the variables as stored on the stack. On escapement of such variables to storage in temporary object 502, the pointers are overwritten with the corresponding values as stored on the stack, after which the variables are removed from the stack.

Note that while JavaScript (or similar) code may be written based on the assumption that the variables of a first function are available, even after return of the first function, to a second function, much code written in JavaScript or a similar language does not rely on this particular behavior. For such code, it is advantageous to store function variables in the stack, and the approach disclosed herein would result in function variables being stored in the stack, with no provision being made to escape such variables to a temporary object or other structure in heap memory, because an analysis of the code during compilation would indicate that no function requires such escapement. Even in the case of a script or other code that includes portions which rely on one or more variables of a first function to be available to a second function even after return of the first function, it is advantageous to store the first function's variables in the stack for efficient access, for example efficient access during the execution of the first function, at times prior to return of the first function, and later to escape such variables to a temporary object or other structure or location in heap memory, as disclosed herein. Under the approach described herein, the variables of other functions, i.e., those not determined to be required to be available to another function after the function with which the variables are associated has returned, are stored in the stack with no provision being made to escape them to a temporary object or other structure or location in heap memory.

Figure 6:
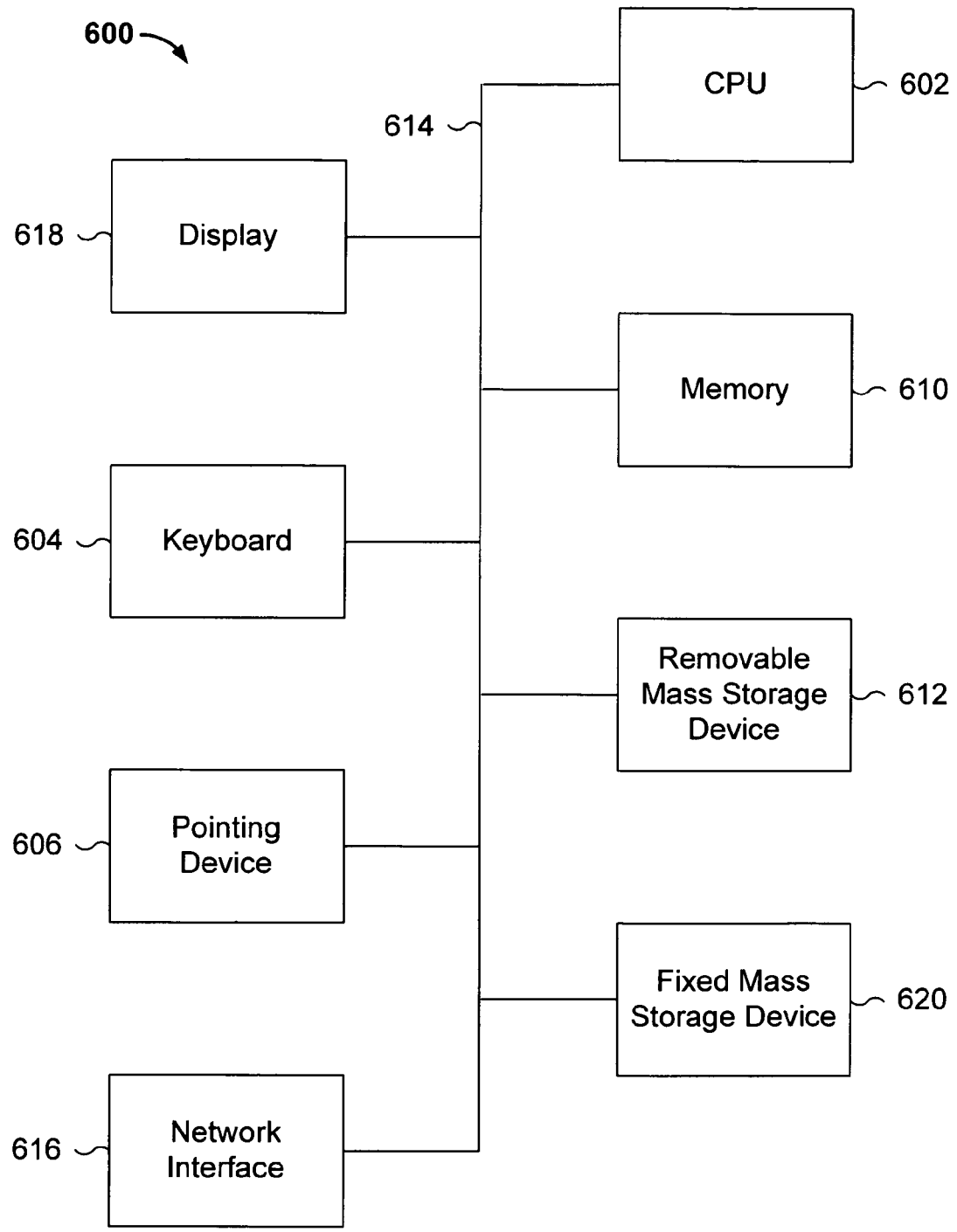
FIG. 6 is a block diagram of a computer system 600 used in some embodiments to optimize the storage of function variables as described herein.

FIG. 6 is a block diagram of a computer system 600 used in some embodiments to optimize the storage of function variables and to store function variables as described herein. FIG. 6 illustrates one embodiment of a general purpose computer system. Other computer system architectures and configurations can be used for carrying out the processing of the present invention. Computer system 600, made up of various subsystems described below, includes at least one microprocessor subsystem (also referred to as a central processing unit, or CPU) 602. That is, CPU 602 can be implemented by a single-chip processor or by multiple processors. In some embodiments CPU 602 is a general purpose digital processor which controls the operation of the computer system 600. Using instructions retrieved from memory 610, the CPU 602 controls the reception and manipulation of input data, and the output and display of data on output devices. In some embodiments, CPU 602 implements the process of FIG. 4.

CPU 602 is coupled bi-directionally with memory 610 which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. It can also store programming instructions and data, in the form of data objects and text objects, in addition to other data and instructions for processes operating on CPU 602. Also as well known in the art, primary storage typically includes basic operating instructions, program code, data and objects used by the CPU 602 to perform its functions. Primary storage devices 610 may include any suitable computer-readable storage media, described below, depending on whether, for example, data access needs to be bi-directional or uni-directional. CPU 602 can also directly and very rapidly retrieve and store frequently needed data in a cache memory (not shown). In some embodiments, memory 610 includes a heap memory, such as heap memory 306 described above.

A removable mass storage device 612 provides additional data storage capacity for the computer system 600, and is coupled either bi-directionally (read/write) or uni-directionally (read only) to CPU 602. Storage 612 may also include computer-readable media such as magnetic tape, flash memory, signals embodied on a carrier wave, PC-CARDS, portable mass storage devices, holographic storage devices, and other storage devices. A fixed mass storage 620 can also provide additional data storage capacity. The most common example of mass storage 620 is a hard disk drive. Mass storage 612, 620 generally store additional programming instructions, data, and the like that typically are not in active use by the CPU 602. It will be appreciated that the information retained within mass storage 612, 620 may be incorporated, if needed, in standard fashion as part of primary storage 610 (e.g. RAM) as virtual memory.

In addition to providing CPU 602 access to storage subsystems, bus 614 can be used to provide access other subsystems and devices as well. In the described embodiment, these can include a display monitor 618, a network interface 616, a keyboard 604, and a pointing device 606, as well as an auxiliary input/output device interface, a sound card, speakers, and other subsystems as needed. The pointing device 606 may be a mouse, stylus, track ball, or tablet, and is useful for interacting with a graphical user interface.

The network interface 616 allows CPU 602 to be coupled to another computer, computer network, or telecommunications network using a network connection as shown. Through the network interface 616, it is contemplated that the CPU 602 might receive information, e.g., data objects or program instructions, from another network, or might output information to another network in the course of performing the above-described method steps. Information, often represented as a sequence of instructions to be executed on a CPU, may be received from and outputted to another network, for example, in the form of a computer data signal embodied in a carrier wave. An interface card or similar device and appropriate software implemented by CPU 602 can be used to connect the computer system 600 to an external network and transfer data according to standard protocols. That is, method embodiments of the present invention may execute solely upon CPU 602, or may be performed across a network such as the Internet, intranet networks, or local area networks, in conjunction with a remote CPU that shares a portion of the processing. Additional mass storage devices (not shown) may also be connected to CPU 602 through network interface 616.

An auxiliary I/O device interface (not shown) can be used in conjunction with computer system 600. The auxiliary I/O device interface can include general and customized interfaces that allow the CPU 602 to send and, more typically, receive data from other devices such as microphones, touch-sensitive displays, transducer card readers, tape readers, voice or handwriting recognizers, biometrics readers, cameras, portable mass storage devices, and other computers.

In addition, embodiments of the present invention further relate to computer storage products with a computer readable medium that contains program code for performing various computer-implemented operations. The computer-readable medium is any data storage device that can store data which can thereafter be read by a computer system. The media and program code may be those specially designed and constructed for the purposes of the present invention, or they may be of the kind well known to those of ordinary skill in the computer software arts. Examples of computer-readable media include, but are not limited to, all the media mentioned above: magnetic media such as hard disks, floppy disks, and magnetic tape; optical media such as CD-ROM disks; magneto-optical media such as floptical disks; and specially configured hardware devices such as application-specific integrated circuits (ASICs), programmable logic devices (PLDs), and ROM and RAM devices. The computer-readable medium can also be distributed as a data signal embodied in a carrier wave over a network of coupled computer systems so that the computer-readable code is stored and executed in a distributed fashion. Examples of program code include both machine code, as produced, for example, by a compiler, or files containing higher level code that may be executed using an interpreter.

The computer system shown in FIG. 6 is but an example of a computer system suitable for use with the invention. Other computer systems suitable for use with the invention may include additional or fewer subsystems. In addition, bus 614 is illustrative of any interconnection scheme serving to link the subsystems. Other computer architectures having different configurations of subsystems may also be utilized.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for processing software code, comprising:
while analyzing a high-level code, determining programmatically that:
variables of a first function are required to be available for use by a second function subsequent to a return of the first function, and
variables of a third function are not required to be available for use by the second function subsequent to a return of the third function,
wherein the determining comprises identifying that the second function continues to reference the variables of the first function, but not the variables of the third function, subsequent to the return of the first function; and
when compiling the high-level code into machine code:
generating automatically for the first function a first segment of machine code that, when executed, is configured to:
copy values of the variables of the first function from a storage location in a stack memory to temporary objects stored in a heap memory prior to the values of the variables of the first function being removed from the stack memory in response to the return of the first function, wherein:
during execution of the first function, the temporary objects store pointers to the storage location in the stack memory, and,
subsequent to the return of the first function, and during execution of the second function, the temporary objects store the copied values instead of the pointers; and
generating automatically for the third function a second segment of machine code that, when executed, is configured to cause values of the variables of the third function to be removed from the stack memory when the third function returns.

2. The method of claim 1, wherein the second function and the third function are created during execution of the first function.

3. The method of claim 1, wherein the first function performs one or more of the following actions: returns the second function, and stores an output of the second function in a globally-accessible variable.

4. The method of claim 1, wherein the stack memory is configured to facilitate execution of at least the first function, the second function, and the third function.

5. The method of claim 1, wherein the high-level code is a source code for the software code.

6. The method of claim 5, wherein the source code is written in a programming language that is configured to store function variables in heap memory.

7. The method of claim 5, wherein the source code comprises JavaScript.

8. The method of claim 5, further comprising generating an intermediate representation of the source code.

9. A system for processing software code, comprising:
a memory; and
a processor coupled to the memory and configured to:
while analyzing a high-level code, determining programmatically that:
variables of a first function are required to be available for use by a second function subsequent to a return of the first function, and
variables of a third function are not required to be available for use by the second function subsequent to a return of the third function,
wherein the determining comprises identifying that the second function continues to reference the variables of the first function, but not the variables of the third function, subsequent to the return of the first function; and
when compiling the high-level code into machine code:
generating automatically for the first function a first segment of machine code that, when executed, is configured to:
copy values of the variables of the first function from a storage location in a stack memory to temporary objects stored in a heap memory prior to the values of the variables of the first function being removed from the stack memory in response to the return of the first function, wherein:
during execution of the first function, the temporary objects store pointers to the storage location in the stack memory, and,
subsequent to the return of the first function, and during execution of the second function, the temporary objects store the copied value instead of the pointers; and
generating automatically for the third function a second segment of machine code that, when executed, is configured to cause values of the variables of the third function to be removed from the stack memory when the third function returns.

10. The system of claim 9, wherein the high-level code comprises one or more of the following: source code, an intermediate representation of source code, code written in a programming language that is configured to store function variables in heap memory, and JavaScript.

11. The system of claim 9, wherein the high-level code comprises an intermediate representation of a source code with which the first function is associated.

12. The system of claim 9, wherein the second function and the third function are created during execution of the first function.

13. The system of claim 9, wherein the first function performs one or more of the following actions: returns the second function, and stores an output of the second function in a globally-accessible variable.

14. A computer program product for processing software code, the computer program product being embodied in a non-transitory computer readable storage medium and comprising computer instructions that, when executed by a processor, cause the processor to implement a method, the method comprising:

while analyzing a high-level code, determining programmatically that:
  variables of a first function are required to be available for use by a second function subsequent to a return of the first function, and
  variables of a third function are not required to be available for use by the second function subsequent to a return of the third function,
  wherein the determining comprises identifying that the second function continues to reference the variables of the first function, but not the variables of the third function, subsequent to the return of the first function; and
when compiling the high-level code into machine code:
  generating automatically for the first function a first segment of machine code that, when executed, is configured to:
    copy values of the variables of the first function from a storage location in a stack memory to temporary objects stored in a heap memory prior to the values of the variables of the first function being removed from the stack memory in response to the return of the first function, wherein:
      during execution of the first function, the temporary objects store pointers to the storage location in the stack memory, and,
      subsequent to the return of the first function, and during execution of the second function, the temporary objects store the copied values instead of the pointers; and
  generating automatically for the third function a second segment of machine code that, when executed, is configured to cause values of the variables of the third function to be removed from the stack memory when the third function returns.

15. The computer program product of claim 14, wherein the high-level code comprises one or more of the following: source code, an intermediate representation of source code, code written in a programming language that is configured to store function variables in heap memory, and JavaScript.

16. The computer program product of claim 14, wherein the high-level code comprises an intermediate representation of a source code with which the first function is associated.

17. The computer program product of claim 14, wherein the second function and the third function are created during execution of the first function.

18. The computer program product of claim 14, wherein the first function performs one or more of the following actions: returns the second function, and stores an output of the second function in a globally-accessible variable.

19. A system for processing software code, comprising:
a memory;
a processor coupled to the memory;
means for determining, while analyzing a high-level code, that:
variables of a first function are required to be available for use by a second function subsequent to a return of the first function, and
variables of a third function are not required to be available for use by the second function subsequent to a return of the third function,
wherein the determining comprises identifying that the second function continues to reference the variables of the first function, but not the variables of the third function, subsequent to the return of the first function; and
when compiling the high-level code into machine code:
means for generating automatically for the first function a first segment of machine code that, when executed, is configured to:
  copy values of the variables of the first function from a storage location in a stack memory to temporary objects stored in a heap memory prior to the values of the variables of the first function being removed from the stack memory in response to the return of the first function, wherein:
    during execution of the first function, the temporary objects store pointers to the storage location in the stack memory, and,
    subsequent to the return of the first function, and during execution of the second function, the temporary objects store the copied values instead of the pointers; and
means for generating automatically for the third function a second segment of machine code that, when executed, is configured to cause values of the variables of the third function to be removed from the stack memory when the third function returns.

20. The system of claim 19, wherein the second function and the third function are created during execution of the first function.

21. The system of claim 19, wherein the first function performs one or more of the following actions: returns the second function, and stores an output of the second function in a globally-accessible variable.

* * * * *